*(12)* United States Patent
Xiong et al.

(10) Patent No.: US 11,429,620 B2
(45) Date of Patent: Aug. 30, 2022

(54) DATA STORAGE SELECTION BASED ON DATA IMPORTANCE

(71) Applicant: Western Digital Technologies, Inc., San Jose, CA (US)

(72) Inventors: Shaomin Xiong, Newark, CA (US); Toshiki Hirano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 148 days.

(21) Appl. No.: 16/915,793

(22) Filed: Jun. 29, 2020

(65) Prior Publication Data

US 2021/0406269 A1 Dec. 30, 2021

(51) Int. Cl.
*G06N 5/02* (2006.01)
*G06F 16/2457* (2019.01)

(52) U.S. Cl.
CPC ......... *G06F 16/24578* (2019.01); *G06N 5/02* (2013.01)

(58) Field of Classification Search
CPC .............. G06F 16/24578; G06F 16/278; G06F 16/2237; G06F 15/161; G06N 5/02
See application file for complete search history.

(56) References Cited

U.S. PATENT DOCUMENTS

| | | | |
|---|---|---|---|
| 6,725,259 B1 * | 4/2004 | Bharat | G06F 16/951 709/219 |
| 7,523,140 B2 | 4/2009 | Mosek | |
| 8,468,157 B2 | 6/2013 | Saito et al. | |
| 9,477,670 B2 | 10/2016 | Bhasin et al. | |
| 9,727,618 B2 | 8/2017 | Sharp et al. | |
| 10,606,708 B2 | 3/2020 | Banasik et al. | |
| 2005/0044487 A1 * | 2/2005 | Bellegarda | G06K 9/6219 715/229 |
| 2007/0271224 A1 * | 11/2007 | Essafi | G06F 16/41 |
| 2008/0027905 A1 * | 1/2008 | Jensen | G06F 16/248 |
| 2009/0070325 A1 * | 3/2009 | Gabriel | G06F 16/35 |
| 2011/0219012 A1 | 9/2011 | Yih et al. | |
| 2012/0041955 A1 * | 2/2012 | Regev | G06F 16/355 707/740 |
| 2013/0262418 A1 | 10/2013 | Bhasin et al. | |

(Continued)

OTHER PUBLICATIONS

Filipov, Philip, et al., SSD Speed Tweaks, Tweaking guide for optimizing Solid State Drive performance and reliability, speedguide.net Article, Feb. 11, 2010, (6 pages).

(Continued)

*Primary Examiner* — Robert W Beausoliel, Jr.
*Assistant Examiner* — Pedro J Santos
(74) *Attorney, Agent, or Firm* — Patent Law Works LLP

(57) ABSTRACT

An example system and method may provide an importance score for a data file based on the content of the data file. An importance score may be used to determine whether to store the data file in a regular reliability storage media or in a higher reliability storage media. A controller generates a document vector for a data file based on content processed from a data file. The data file includes metadata and the content. The controller generates, using an artificial intelligence (AI) model and the document vector, a data file importance score for the data file. The controller then stores the data file in one of the first data storage zone and the second data storage zone based on the data file importance score.

20 Claims, 14 Drawing Sheets

(56) References Cited

U.S. PATENT DOCUMENTS

| | | |
|---|---|---|
| 2014/0258283 A1 | 9/2014 | Charng et al. |
| 2017/0017658 A1 | 1/2017 | Blong et al. |
| 2017/0220422 A1 | 8/2017 | Butt |
| 2018/0067957 A1 | 3/2018 | Paterson et al. |
| 2018/0129674 A1 | 5/2018 | Kim et al. |
| 2018/0373600 A1 | 12/2018 | Xu et al. |
| 2019/0188295 A1 | 6/2019 | Sirotkovic et al. |
| 2019/0228148 A1 | 7/2019 | Pohl et al. |
| 2019/0251097 A1* | 8/2019 | Shmueli ................ G06F 16/278 |
| 2019/0347338 A1 | 11/2019 | Mani et al. |
| 2020/0034447 A1 | 1/2020 | Lapointe et al. |
| 2020/0167469 A1 | 5/2020 | Kochura et al. |
| 2021/0149564 A1 | 5/2021 | Luo et al. |

OTHER PUBLICATIONS

Romero-Ramirez, Alicia, et al., Automatic classification of defects in a Automatic classification of defects with the review of an appropriate feature extraction. Studies in Applied Electromagnetics and Mechanics, 2008.

Zuolo, Lorenzo, et al., Analysis of Reliability/Performance Trade-off in Solid State Drives, Conference Paper 2014 IEEE International Reliability Physics Symposium, Jun. 2014, (6 pages), doi:10.1109/irps.2014.6860646.

U.S. Appl. No. 16/249,522 filed by Tomer Eliash et al., entitled "System and Method for Storage System Property Deviation".

U.S. Appl. No. 16/713,620 filed by Laxmi Bhoopali et al., entitled "Storage System and Method for User-Defined Data Archiving".

* cited by examiner

Learning Process on Existing Data

Processing New Data ically rotating hard disk drives. Accordingly, it would be beneficial to store higher-important information in a more reliable storage medium in order to reduce data loss from storage medium failure.

DATA STORAGE SELECTION BASED ON DATA IMPORTANCE

TECHNICAL FIELD

The present disclosure generally relates to data storage, and in a more particular non-limiting example, to storing data differently based on the content in a data file.

BACKGROUND

Generally, data in a data storage system is stored in an indiscriminate manner, namely, data of different importance to a user is conventionally stored without regard to the importance of the data to user. Such indiscriminate storage of data results in significant frustration and loss to a user when a storage device fails and the user has stored important data files without regard to the reliability of the underlying storage medium.

For example, when a hard disk drive fails, recovery or replacement of data that is readily available such as form documents, published textual materials, and public images or videos is readily performed. However, when a hard disk drive fails that contains highly personal documents, data, or images or videos, recovery or replacement may be impossible since no other copies of these materials may even exist.

Different types of storage exhibit different levels of reliability. For example, solid-state drives utilize no moving parts and are therefore less susceptible to mechanical failure than mechanically rotating hard disk drives. Accordingly, it would be beneficial to store higher-important information in a more reliable storage medium in order to reduce data loss from storage medium failure.

SUMMARY

In general, one innovative aspect of the subject matter described in this disclosure may be embodied in a system that includes storage medium including a first data storage zone and a second data storage zone, and a controller. The controller configured to generate a document vector for a data file based on content processed from a data file, wherein the data file includes metadata and the content, generate, using an artificial intelligence (AI) model and the document vector, a data file importance score for the data file, and store the data file in one of the first data storage zone and the second data storage zone based on the data file importance score.

In one implementation, the controller is further configured to generate a cluster of document vectors including the document vector and other document vectors associated with other data files, wherein the data file importance score is generated by the AI model based on a location of the document vector in the cluster of document vectors. In further implementations, the controller is further configured to generate a rank of the document vectors in the cluster, the rank based on the location of the document vectors in the cluster, and generate weights for the AI model based on the rank of the document vectors in the cluster. In yet further implementations, the controller is further configured to re-rank the cluster of document vectors, and update the weights for the AI model in response to the re-rank of the cluster. Further, the re-rank of the cluster of document vectors is based on a duration of time since a previous re-rank of the cluster of document vectors, or a received request to re-rank the cluster of document vectors. In other implementations, the controller is configured to determine a quantity of data files stored in the storage medium since an occurrence of the rank of the cluster of document vectors or a previous re-rank of the cluster of document vectors, wherein the re-rank of the cluster of document vectors is based on the quantity of data files. In yet further implementations, the controller is further configured to receive a request including a user input provided via a computing device of a user, the user input including a user-input importance score, and update the weights for the AI model based on a difference between the importance score generated by the AI model and a user-input importance score being greater than a threshold. Further implementations include the controller configured to receive the data file including the metadata and the content, scan the content in the data file for keywords in at least one of the metadata and the content, generate respective vectors for the data file based on the keywords, and combine the respective vectors to form the document vector.

Another general aspect includes a computer implemented method comprising generating a document vector for a data file based on content processed from a data file, wherein the data file includes metadata and the content, generating, using an artificial intelligence (AI) model and the document vector, a data file importance score for the data file, and storing the data file in one of a first data storage zone and a second data storage zone of a storage medium based on the data file importance score.

In one implementation, the computer-implemented method further includes generating a cluster of document vectors including the document vector and other document vectors associated with other data files, wherein the data file importance score is generated by the AI model based on a location of the document vector in the cluster of document vectors. In another implementation, the computer-implemented method further includes generating a cluster of document vectors including the document vector and other document vectors associated with other data files, wherein the data file importance score is generated by the AI model based on a location of the document vector in the cluster of document vectors. In yet another implementation, the computer-implemented method includes generating a rank of the document vectors in the cluster, the rank based on the location of the document vectors in the cluster, and generating weights for the AI model based on the rank of the document vectors in the cluster. In yet another implementation, the computer-implemented method includes re-ranking the cluster of document vectors, and updating the weights for the AI model in response to the re-rank of the cluster. In yet another implementation, the re-rank of the cluster of document vectors is based on a duration of time since a previous re-rank of the cluster of document vectors, or a received request to re-rank the cluster of document vectors. In yet another implementation, the computer-implemented method further includes determining a quantity of data files stored in the storage medium since an occurrence of the rank of the cluster of document vectors or a previous re-rank of the cluster of document vectors, wherein the re-rank of the cluster of document vectors is based on the quantity of data files. In yet another implementation, the computer-implemented method further includes receiving a request including a user input provided via a computing device of a user, the user input including a user-input importance score, and updating the weights for the AI model based on a difference between the importance score generated by the AI model and a user-input importance score being greater than a threshold. In yet another implementation, the computer-implemented method further includes receiving the data file including the metadata and the content, scanning the content in the data file for keywords in at least one of the metadata and the content, generating respective vectors for the data file based on the keywords, and combining the respective vectors to form the document vector. Yet further implementations include keywords that include defined words that are unique to a specific user.

Another general aspect includes a system comprising a means for generating a document vector for a data file based on content processed from a data file, wherein the data file includes metadata and the content, a means for generating, using an artificial intelligence (AI) model and the document vector, a data file importance score for the data file, and a means for storing the data file in one of a first data storage zone and a second data storage zone of a storage medium based on the data file importance score.

The various embodiments include operations to overcome or at least reduce the issues in the previous storage networks and/or systems discussed above and, accordingly, are more reliable and/or efficient than other storage systems. That is, the various embodiments disclosed herein include hardware and/or software with functionality to improve the cost-effective placement of data files in an appropriate storage based on the content of the data file. Accordingly, the embodiments disclosed herein provide various improvements to storage networks and/or storage systems.

It should be understood that the language used in the present disclosure has been principally selected for readability and instructional purposes, and not to limit the scope of the subject matter disclosed herein.

DETAILED DESCRIPTION

Data files may contain various types of data. For example, data files may include textual data, image data, and various forms of video content. While data file types may be differently stored based upon their file types, different data files may be of more or lesser importance to a user based upon various factors including sentimental value, highly personal data and data that may be difficult or impossible to reconstruct if lost or damaged.

As stated, data files have very different levels of importance to a user. Some data is more important such as a wedding photo versus a readily replaceable online photo. Further, textual based documents such as tax documents for a user may be more important than a textual based document such as a service manual that is readily replaceable. While loss of any data to a user is undesirable, loss of important data may significantly impact the efficiency and well-being of the user. Further, some data files may be of extreme importance to a user and should be further protected from data tamper such as from protection from malware or other means. Data loss and tamper may occur to any data. However, data loss of important data is much more problematic.

Various data storage devices exhibit different levels of reliability by nature and by construction. Some semiconductor dies used for solid-state storage may exhibit earlier mortality rates than others. Also, solid-state storage drives often degrade over time with continued use, making reads and writes to some dies, blocks, etc., more error or failure prone. Similarly, some magnetic heads on hard disk drives may be more or less reliable than others. Accordingly, selecting a more suitable type of storage device for storing differently important data files could mitigate data loss.

Data storage devices typically include a controller capable of managing different levels of data protection and further capable of deciding where and how to store the data files such as employing techniques including RAID and error correction coding (ECC). Accordingly, the various aspects described herein identify and utilize an importance factor, such as an importance score, to differently store data files based upon the identified importance score.

Figure 1:
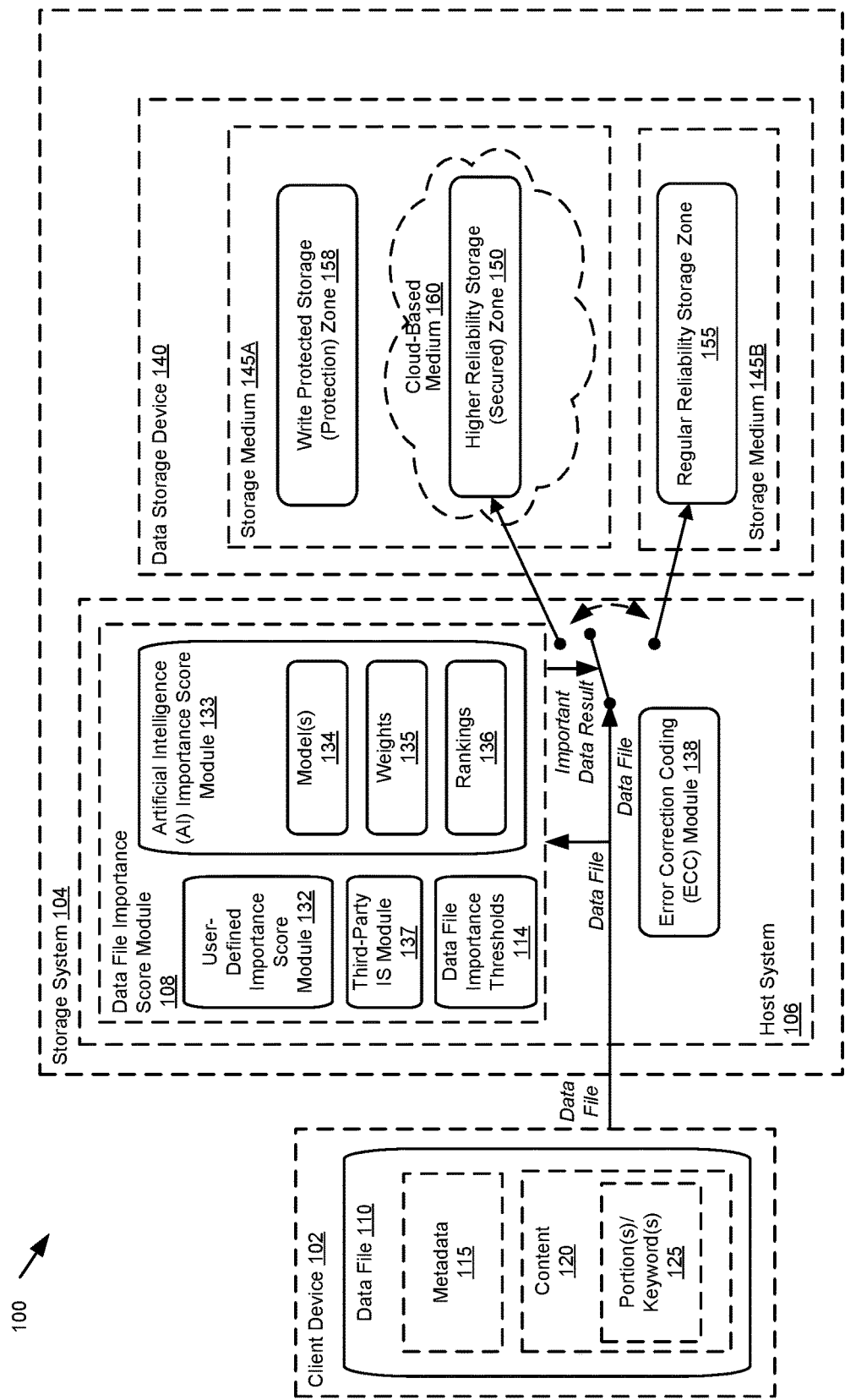
FIG. 1 illustrates a block diagram of an example system for differently storing data files having different importance.

FIG. 1 illustrates a block diagram of an example system for differently storing data files that are determined to be more or less important. A system 100 includes a client device 102 and a storage system 104. The client device 102 includes a data file 110 which is provided to the storage system 104 for retention of the data file. The data file 110 may include metadata 115 and content 120. The metadata 115 may include information related to the data file 110. The content 120 may further include one or more portions or keywords 125 which will be further described herein.

The storage system 104 may be configured as a data storage hub for remote storage. Storage system 104 may also be configured as part of a personal cloud or computer storage system. The data storage system 140 further implements a means for storing the data file in a first data storage zone of a storage medium in a data storage device, in response to the data file importance score being greater than a data file importance threshold. The data storage system 140 further implements a means for storing the data file in a second data storage zone of the storage medium in the data storage device, in response to the data file importance score being less than the data file importance threshold.

As illustrated in FIG. 1, storage system 104 includes a host system 106 operably coupled to the data storage device 140. The data storage device 140 may include storage medium 145 and may be comprised of various storage medium including a solid-state drive (SSD) and/or a hard disk drive (HDD). Further, storage medium 145 may be a hybrid configuration where the storage medium 145 is partitioned into a first storage medium 145A and a second storage medium 145B.

The storage medium 145 may include one or more zones of differing reliability for storing differently important data files. Specifically, storage medium 145 includes a higher reliability storage zone 150 and a regular reliability storage zone 155. The storage zones 150 and 155 may be formed from the same storage medium using different the reliable aspects of the storage medium. For example, higher reliability hardware may be utilized for generating the higher reliability storage zone 150. The higher reliability storage zone 150 may also be known as a secured zone.

As stated, the higher reliability storage zone 150 may contain more reliable medium (hardware), or may contain RAID storage (more copies) of the stored data file. Further, the higher reliability storage zone 150 may include stronger error correction coding (ECC), performed by error correction coding module 138, to provide the enhanced reliability. The storage medium 145 may also include a write-protected storage zone 158. The write-protected storage zone 158 provides software, firmware, or hardware protection to block the ability for the host system 106 to overwrite a data file stored in the write-protected storage zone 158. The write-protected storage zone may also be known as a protection zone 158.

One of the benefits of the above architecture includes the benefit of better protection of important data files resulting in a reduction in the loss of data files that are determined to be more important to a user. Further, in response to data tampering due to software malware, data stored in a higher reliability storage zone 150 and, in particular, data files stored in the write-protected storage zone 158, are further protected from data tampering.

In an implementation where the storage medium 145 is configured as a hard disk drive (HDD), the disk, including the head of the disk, may be implemented in a higher reliability arrangement. For example, the head medium spacing between the head and disk in an HDD may be slightly increased to improve the reliability of the medium. Such an improvement may therefore cause the HDD or a zone on an HDD to result in a higher reliability storage zone 150. In a solid-state device (SSD), an increased reliability zone (a secured storage zone) may be located in a flash array. Further, the SSD may include an internal RAID to protect higher importance data files from loss by using different schemes in a RAID configuration. Write protection in both the HDD and the SSD may be achieved by firmware or hardware to create a write-protected storage zone 158.

FIG. 1 further illustrates an aspect where the higher reliability storage zone 150 may, in one aspect, be incorporated into a cloud-based medium 160. The cloud-based medium 160 may be integrated into an overall defined storage medium 145 which is configured to differently store differently important data files, as described herein.

The host system 106 includes a controller 205 (FIG. 2) and stored instructions for implementing a data file importance score module 108. The data file importance score module 108 generates a data file importance score (IS) based upon one or more various techniques. The data file importance score module 108 further implements a means for generating a data file importance score based on a data file.

For example, the data file importance score module 108 may generate a data file importance score (IS) based on (1) a user-defined or user-input importance score, (2) an artificial intelligence (AI) generated importance score (IS), or (3) a third party-generated importance score (IS). Further, various aspects may use one or more of the above techniques either individually or in combination with each other. The data file importance score (IS) is then used by the host system 106 to determine whether to store the data file in a higher reliability storage zone 150 or in a regular reliability storage zone 155.

As stated, the data file importance score module 108 may include a user-defined important data module 132 which is used to identify a data file importance score based upon user input. Using such a technique, a user tags or identifies a data file with a specific data file importance score. The user-defined importance score is compared against a data file importance threshold 114 to determine whether to store the data file in a higher liability storage zone 150 or in a regular reliability storage zone 155.

Also as stated, the data file importance score module 108 may also include an alternative scoring technique, implemented using an artificial intelligence (AI) importance score module 133. The artificial intelligence importance score module 133 may also include AI models 134, weights 135, and rankings 136, which are further described below. Artificial intelligence importance score module 133 is configured to learn user habits, file characteristics and provide a data file importance score based on data file components including metadata, keywords, file type, timestamps, and frequency of activities such as creation of the file, access of the file, read, and write activity with respect to the data file.

Generally, some of the vectors of features in the document vectors are enhanced or discounted by the weights. The models are configured to perform clustering and ranking of document vectors using artificial intelligence. In clustering, the document vectors may be mapped into a cluster exhibiting a cluster center. The resulting clustered document vectors are then ranked based upon a distance from the cluster center to each of the document vectors. Other ranking techniques may also be used including similarity matrices, and graph analysis. An importance score is then assigned to each document vector based upon the ranking of the document vector. An important data threshold is then applied to each of the document file importance scores to determine which data files corresponding to a document vector are to be stored in a higher reliability storage zone, and which data files are to be stored in a regular reliability storage zone.

By way of example and not limitation, keywords may include defined words that are unique to a specific user, such as user passwords, user account information, user signature blocks, etc. Fields such as a file type may also be used to determine an importance score. For example, a file type representative of the scanned file may indicate higher importance score for a data file. Further the frequency of file access or user behaviors regarding reading and writing to a data file is also indicative of the importance of the data file and therefore the generation of an importance score. Yet further links, links associated with the data file are also indicative of the importance of the data file. For example, files that link to data files that were previously determined to be important are also indicative of data files exhibiting similar importance to a user. Further, the content 120 of a data file may be analyzed to identify graphical objects or sensitive text in the file may also be indicative of the importance of the data file.

In yet another aspect, the artificial intelligence importance score module 133 may utilize a general model for predicting and importance score based upon the above described techniques. After the generation of an importance score by the artificial intelligence importance score module 133, the artificial intelligence importance score module 133 may incorporate user confirmation, modification, or rejection of the determined importance score. The artificial intelligence importance score module 133 may thereafter request a user's confirmation (input 209 of FIG. 2) that the importance score determined by the artificial intelligence importance score module 133 correctly determined the importance score. Such feedback or confirmation may enable the artificial intelligence importance score module 133 to confirm, modify, or reject the determined data file importance score.

Figure 2:
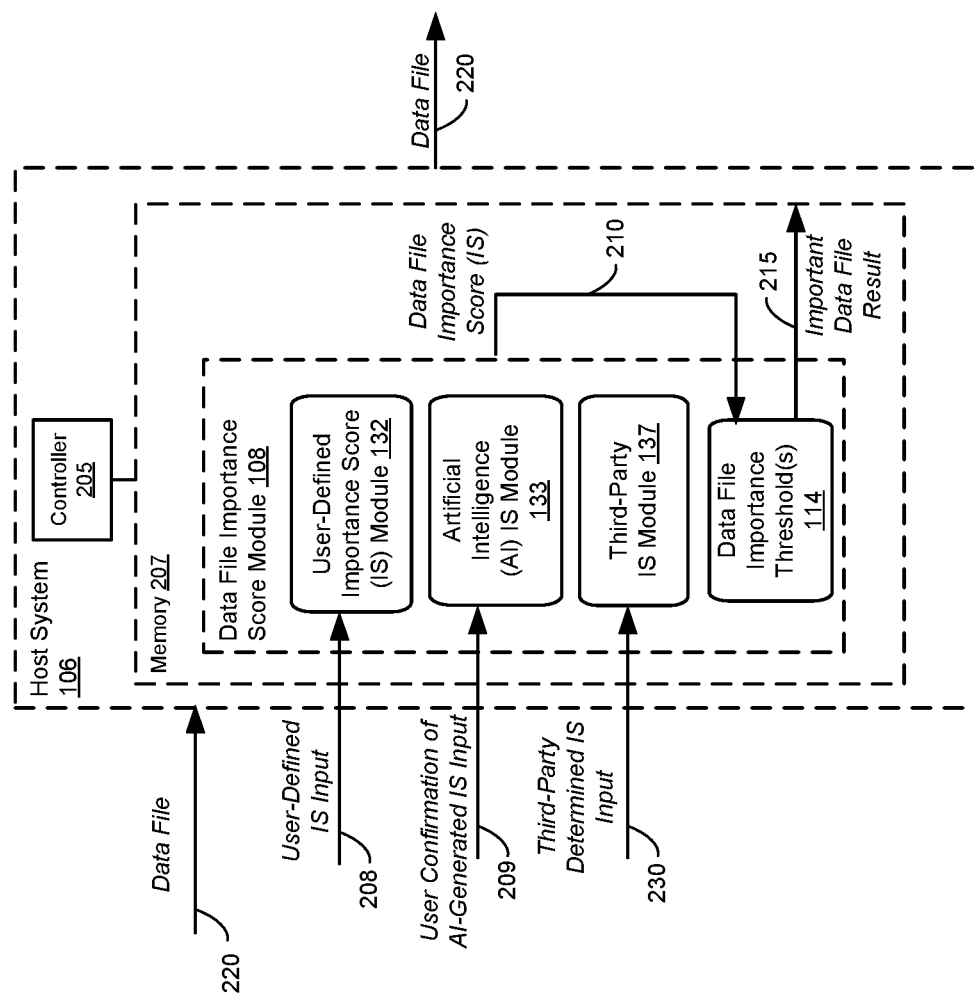
FIG. 2 is a block diagram of an example host system for storing differently important data files.

As stated, the data file importance score module 108 may alternatively include a third-party importance score module 137 configured to implement an importance score generation technique based upon third-party inputs or APIs (input 230 of FIG. 2). The third-party importance scoring may be performed by entities capable of analyzing the data file to determine, for example, whether multiple copies of the data file are readily available online, or if the data file appears to include unique information that may be of higher importance to a user.

Regardless of the specific technique used, the resulting importance score may be compared against one or more data file importance thresholds 114 to determine the reliability level of the storage zone for storing the data file. When a single data file importance threshold is utilized, the selection of storage zones is typically between two zones, while use of multiple data file importance thresholds may be used for selecting a zone from among three or more zones.

FIG. 2 is a block diagram of an example host system for determining when to differently store differently important data files. A host system 106 includes a controller 205 operably coupled to a memory 207. The memory 207 includes executable instructions for carrying out the various aspects of importance scoring and data file storage as described herein. As described, a data file importance score module 108 may include one or more importance score modules, such as user-defined importance score module 132, AI importance score module 133, and third-party importance score module 137.

In one aspect, data file importance score module 108 includes a user-defined importance score module 132. The user-defined importance score module 132 receives user-defined importance score input 208 as determined by a user. The user determination may be received as either a tag related to the data file or real-time user input information. The user-defined importance score module 132 generates a data file importance score 210 that is then compared against one or more data file importance thresholds 114 to generate an important data file result 215. The important data result 215 determines whether to store the data file to a regular reliability storage zone 155 (FIG. 1), or higher reliability storage zone 150 (FIG. 1).

In another aspect, the data file importance score module 108 includes an artificial intelligence importance score module 133. The artificial intelligence importance score module 133 may utilize a general model 134, weights 135, and rankings 136, all illustrated in FIG. 1. The artificial intelligence importance score module then predicts an importance score based upon an analysis of the data file 220.

The artificial intelligence module 133, after analyzing the metadata and content data of the data file 220, generates the data file importance score 210 which is thereafter compared to one or more data file importance thresholds 114 to generate an important data file result 215. The important data file result 215 is thereafter used to determine where, in storage medium 145, to store the data file.

In another aspect, the artificial intelligence importance score module 133 may request a user's confirmation input 209 as another input to the artificial intelligence importance score module 133 to determine the importance score 210. Such confirmation or input 209 enables the artificial intelligence importance score module 133 to improve the accuracy of the model(s) 134, including the weights 135 of FIG. 1. The artificial intelligence importance score module 133 generates a data file importance score 210 that is then compared against one or more data file importance thresholds 114 to generate an important data file result 215. The important data result 215 determines whether to store the data file to a regular reliability storage zone 155 (FIG. 1), or higher reliability storage zone 150 (FIG. 1).

In yet another aspect, data file importance score module 108 includes a third-party importance score module 137. The third-party importance scoring may be performed by entities capable of analyzing the data file to determine, for example, whether multiple copies of the data file are readily available online, or if the data file appears to include unique information that may be of higher importance to a user. The third-party importance score module 137 receives a third-party determined importance score input 230 and generates a data file importance score 210 that is then compared against one or more data file importance thresholds 114 to generate an important data file result 215. The important data result 215 determines whether to store the data file to a regular reliability storage zone 155 (FIG. 1), or higher reliability storage zone 150 (FIG. 1).

Figure 3:
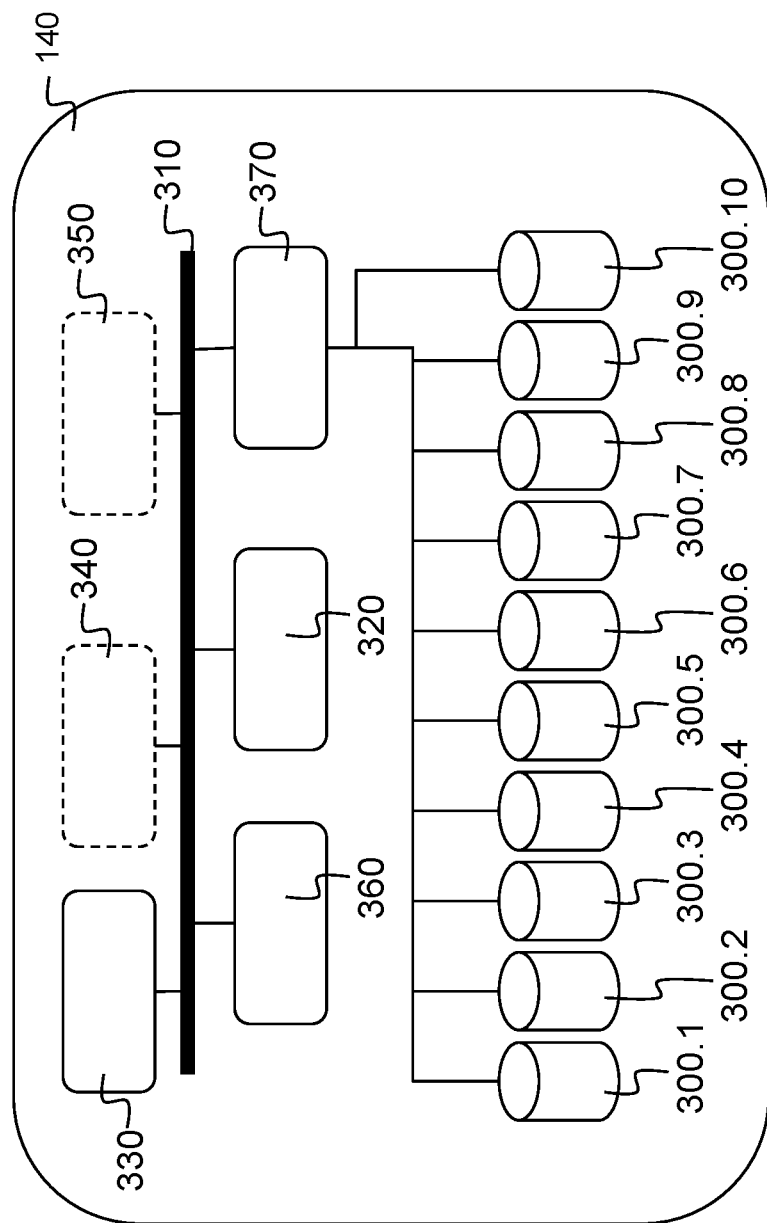
FIG. 3 is a block diagram of an example data storage device for storing differently important data files.

FIG. 3 shows a schematic representation of data storage device 140. Data storage device 140 may comprise a bus 310, a processor 320, a local memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller or backplane management controller, such as storage controllers 130. Bus 310 may include one or more conductors that permit communication among the components of data storage device 140. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320.

Input unit 340 may include one or more conventional mechanisms that permit an operator to input information to the data storage device 140, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables the data storage device 140 to communicate with other devices and/or systems, for example mechanisms for communicating with other data storage devices 140 or controller 205 (FIG. 2) such as for example two 1 Gb Ethernet interfaces.

Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more data storage devices 140, for example, 2 TB SATA-II disk drives or 2 TB non-volatile memory express (NVMe) solid state drives (SSDs), and control the reading and writing of data to/from these storage elements 300. As shown in FIG. 3, such a data storage device 140 could comprise ten 2 TB SATA-II disk drives as storage elements 300.1-300.10 and in this way storage node 120 would provide a storage capacity of 20 TB to the storage system 100.

The system 100 (FIG. 1) may comprises a plurality of storage elements 300. The data storage devices 140 each comprise a share of these storage elements 300. Each data storage device 140 could comprise a similar amount of storage elements, but this is, however, not essential. Data storage device 140 could for example comprise four, eight, ten, or any other number of storage elements appropriate to interface and form factor constraints. The system 100 may be operable to store and retrieve a data objects, data blocks, data files, or other data units comprising data, for example, 64 MB of binary data and a location or object identifier for addressing this data unit, for example a universally unique identifier such as a globally unique identifier (GUID).

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular system 100. It is possible to use for example storage elements with differing storage capacity, storage elements of differing manufacturers, using different hardware technology such as for example conventional hard disks and solid-state storage elements, using different storage interfaces such as for example different revisions of BATA, PATA, SAS, FC, NVMe, and so on. All this results in specific advantages for scalability and flexibility of system 100 as it allows to add or remove storage elements 300 without imposing specific requirements to their design in correlation to other storage elements 300 already in use in that system 100.

Figure 4:
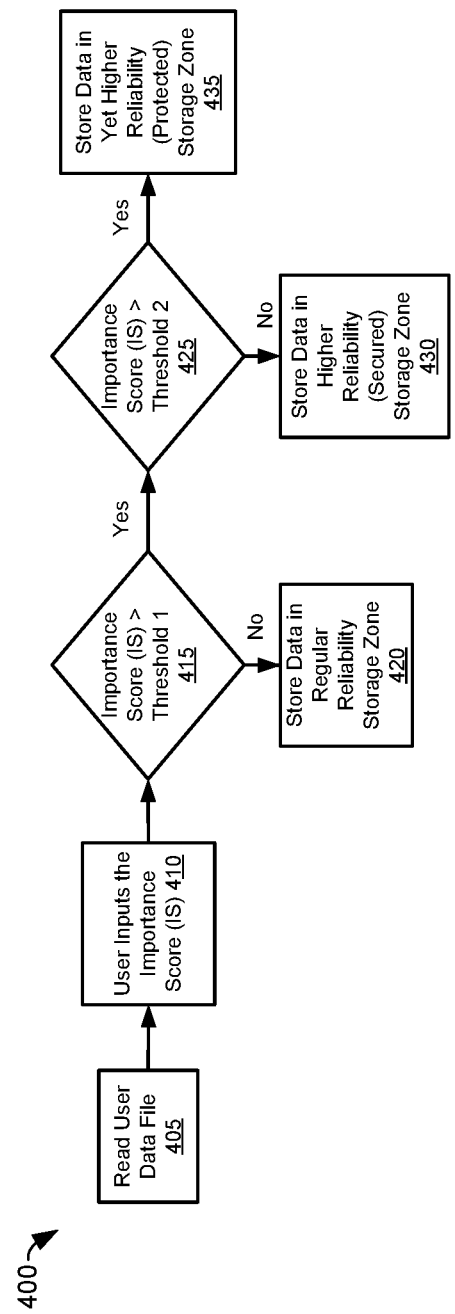
FIG. 4 illustrates a flow diagram for differently storing differently important data files based in part on user input.

FIG. 4 illustrates a flow diagram for differently storing differently important data files based in part on user input. The process 400 may be performed by user-defined importance score module 132 in FIG. 1. In process 400, the user data file is read in block 405. A user or other entity inputs or otherwise provides the user-defined importance score input 208 (FIG. 2) in block 410. The importance score may be provided as a tag or other input from a user with knowledge of the relative importance of the data file.

The received importance score is compared against a data file importance threshold in query 415. The comparison may be against a first data file importance threshold. When the importance score is less than a first data file importance threshold, then the data file in a block 420 is stored in a regular reliability storage zone, such as regular reliability storage zone 155 of FIG. 1. When the importance score is greater than the first data file importance threshold, then the importance score is compared against a second data file importance threshold in a query 425. When the importance score is less than a second data file importance threshold, then the data file in a block 430 is stored in a higher reliability storage zone (secured zone), such as higher reliability storage zone 150 of FIG. 1. When the importance score is greater than the second data file importance threshold, then the data file in block 435 is stored in a yet higher reliability storage zone, such as write-protected storage zone (protection zone) 158 of FIG. 1.

Figure 5:
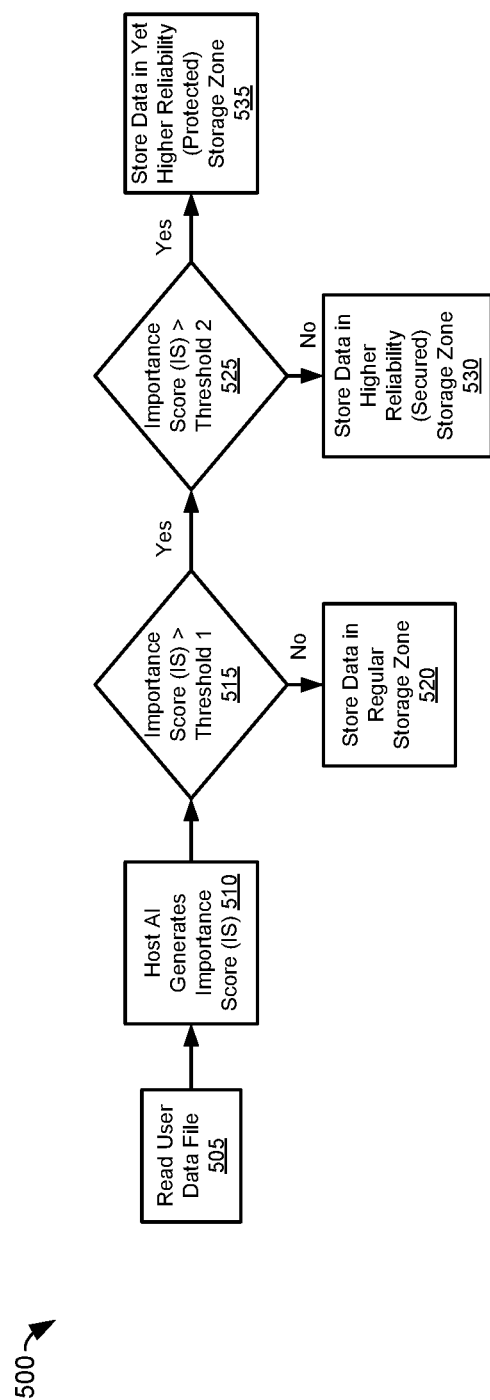
FIG. 5 illustrates a flow diagram for differently storing differently important data files based in part on artificial intelligence models.

FIG. 5 illustrates a flow diagram for differently storing differently important data files based in part on artificial intelligence models. The process 500 may be performed by the artificial intelligence importance score module 133 in FIG. 1. In process 500, the user data file is read in block 505. The artificial intelligence importance score module 133 generates and importance score in a block 510.

The importance score is compared against a data file importance threshold in query 515. The comparison may be against a first data file importance threshold. When the importance score is less than a first data file importance threshold, then the data file in a block 520 is stored in a regular reliability storage zone, such as regular reliability storage zone 155 of FIG. 1. When the importance score is greater than the first data file importance threshold, then the importance score is compared against a second data file importance threshold in a query 525. When the importance score is less than a second data file importance threshold, then the data file in a block 530 is stored in a higher reliability (secured) storage zone, such as higher reliability storage zone 150 of FIG. 1. When the importance score is greater than the second data file importance threshold, then the data file in block 535 is stored in a yet higher reliability (protected) storage zone, such as write-protected storage (protection) zone 158 of FIG. 1.

Figure 6:
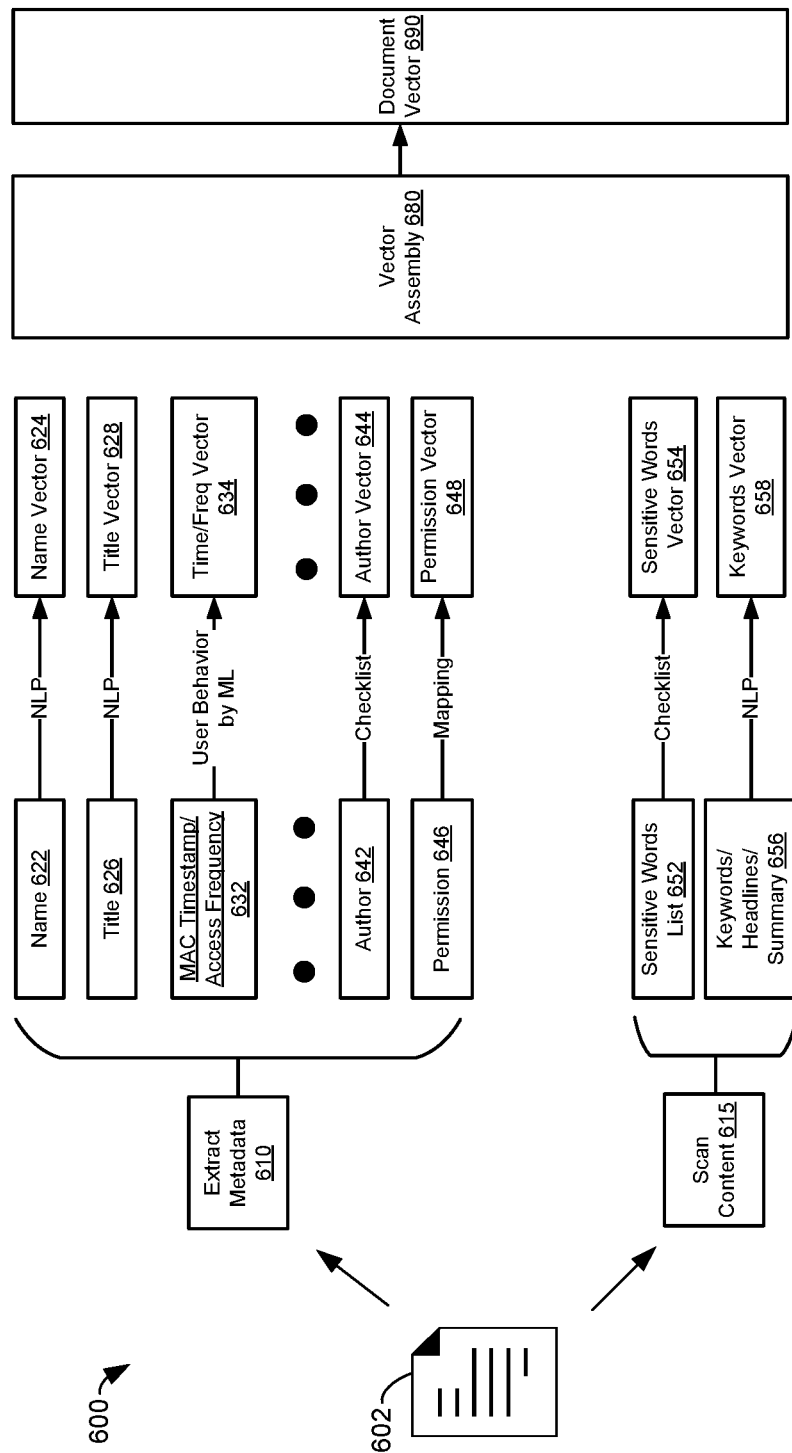
FIG. 6 illustrates a flow diagram of forming a document vector representative of a data file.

FIG. 6 illustrates a flow diagram of a process 600 for forming a document vector representative of a data file. The artificial intelligence importance score module 133 utilizes vectors in the various models 134. Further, the vectors are subjected to weighting by weights 135 and ranked to form rankings 136, of FIG. 1.

A data file 602 is received and decomposed by extracting metadata in a process 610. The metadata may include various fields which may be processed or otherwise converted into vectors. For example, a name field 622 may be subjected to natural language process to generate name vector 624. A title field 626 may be subjected to a natural language process to generate the title vector 628, further, a MAC timestamp or access frequency field 632 may be analyzed by a machine learning algorithm or other statistical process to generate a time frequency vector 634. An author field 642 may be compared against a checklist or other data to generate an author vector 644. A permission field 646 may be mapped or otherwise compared to generate a permission vector 640.

The content of data file 602 may also be scanned in at process 615. The content may include a sensitive word list 652 which may be compared against checklist or other data to generate a sensitive word vector 654. Similarly, keywords, headlines, or summaries 656 in the content may be subjected to natural language processes to generate a keywords vector 658.

The various factors may be processed by a vector assembly process 680 to generate a document vector 690. The document vector 690 is representative of the various attributes of the data file 602.

Figure 7:
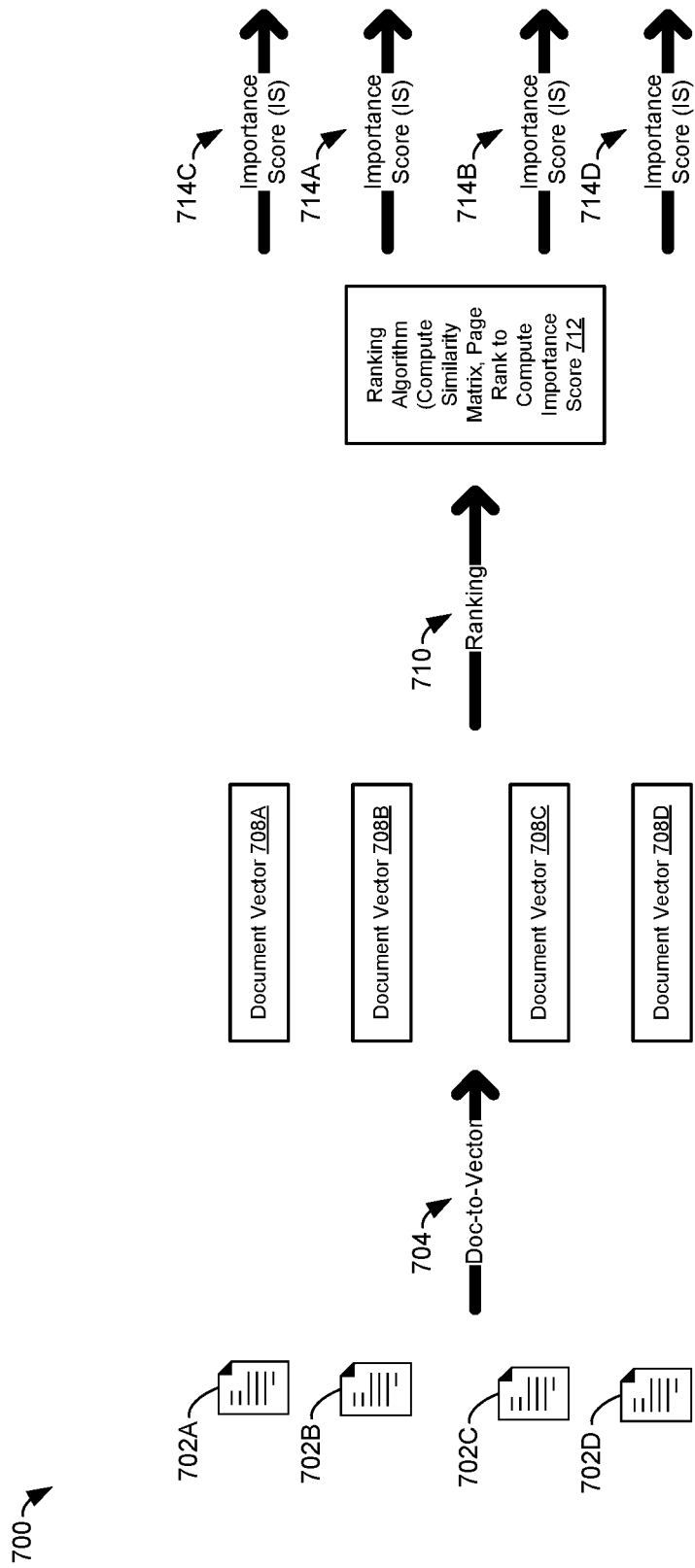
FIG. 7 illustrates a flow diagram for ranking document files based upon determined document vectors.

FIG. 7 illustrates a flow diagram for ranking of document files based upon determined document vectors. The artificial intelligence importance score module 133 may order or generate a rank of a group of documents resulting in the generation of weights 135 for the models 134. In process 700, one or more documents 702 are converted to vectors through the process 704, as described above with respect to process 600 of FIG. 6. The resulting document vectors 708 are then processed in a ranking process 710. A ranking algorithm 712 may compute a similarity matrix or perform other page ranking processes to compute importance scores 714.

Figure 8:
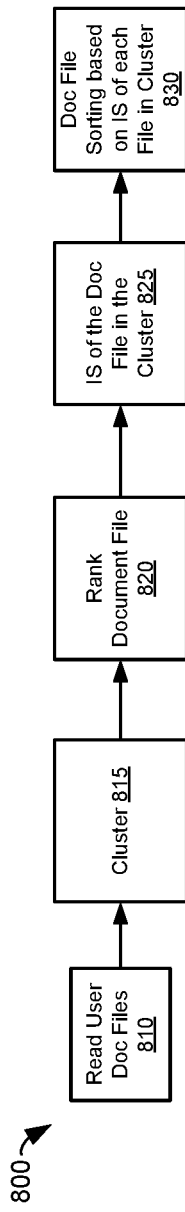
FIG. 8 illustrates a flow diagram for assigning a document vector to a cluster of document vectors.

FIG. 8 illustrates a flow diagram for grouping document files prior to determining a storage destination for the document file. In a block 810, one or more document files are received. In a block 815, the received file document is compared against other known document files in a storage space that were clustered together based on one or more attribute vectors. The newly received document file is added to a cluster that best matches the attribute vectors of the received document file. Clusters may include such attributes such as a group of tax files or other identified attribute of important document files.

In a block 820, the document files in each of the clusters are ranked based on a closeness of the document file attribute vectors and the cluster attributes. In a block 825, an importance score for the received document file is calculated using the artificial intelligence models, and weights described above. In a block 830, the document files in each cluster are sorted based on their importance scores.

Figure 9:
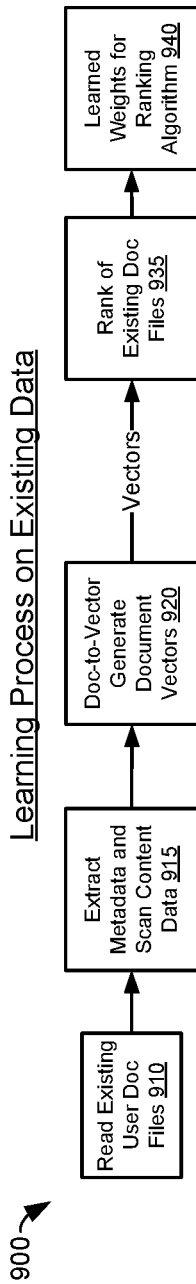
FIG. 9 illustrates a flow diagram for generating weights for models in an artificial intelligence module.

FIG. 9 illustrates a flow diagram for generating weights for models in an artificial intelligence module. The process 900 provides initialization for the ranking algorithm 820 of FIG. 8. In block 910, a known group or existing user document files are selected to be analyzed for the generation of initial weights for the ranking algorithm. In a block 915, the metadata and content data of the documents are extracted. In a block 920, vectors are generated for each of the document files as described above with respect to FIG. 6. In a block 935, the documents are ranked based upon the document vectors for each of the document files. In a block 940, weights are generated based upon the ranking of the existing document files. The weights are used in the ranking algorithm described above in block 820 of FIG. 8.

Figure 10:
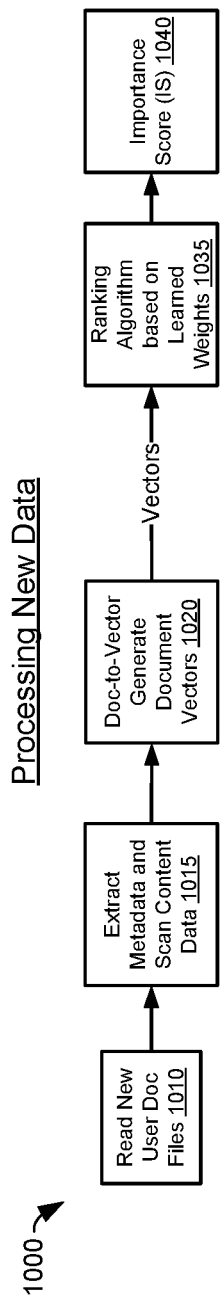
FIG. 10 illustrates a flow diagram for generating an importance score based at least in part on an artificial intelligence model.

FIG. 10 illustrates a flow diagram for generating an importance score based at least in part on an artificial intelligence model. A process 1000 includes an analysis of new data based upon the weights generated in FIG. 9. In a block 1010, a user document file is received which was not used previously for the generation of ranking algorithm weights. In a block 1015, the metadata and content data are extracted as described above with respect to FIG. 6. In a block 1020, a document vector is generated for the new file based upon the vector generation described above with respect to FIG. 6. In a block 1035, the ranking algorithm with the learned weights is performed using the document vector of the new user document file. In a block 1040, an importance score is generated for the new document file.

Figure 11:
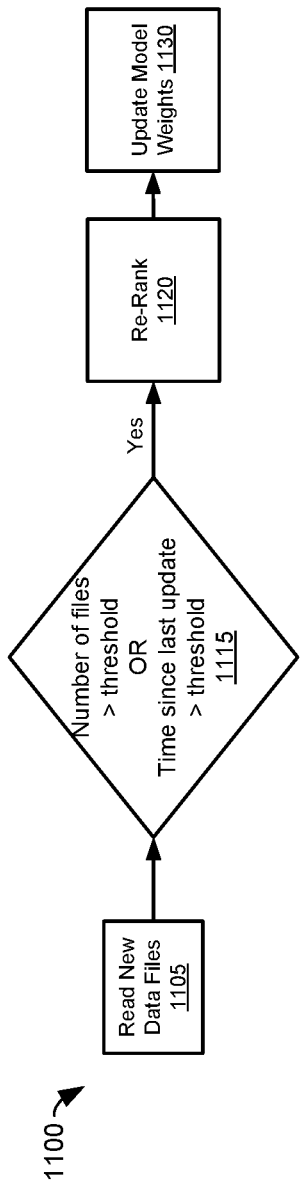
FIG. 11 illustrates a flow diagram for updating model weights for an artificial intelligence model based on new data files or lapsed time.

FIG. 11 illustrates a flow diagram for updating model weights for an artificial intelligence model based on new data files or lapsed time. In a process 1100, the weights used in the ranking algorithm described above may be periodically updated. In a block 1105, new data file is received. A query 1115 may determine to re-rank or update the ranking weights based upon a quantity of new file since the last three ranking or based upon a lapsed time since the last three ranking. When the query 1115 determines the need to re-rank, a block 1120 performs a subsequent or re-ranking process by including the files since the previous ranking in the re-ranking process. In a block 1130, the ranking weights are updated based upon the re-ranking process.

Figure 12:
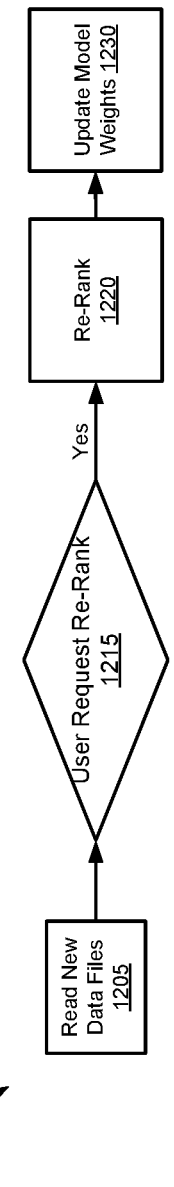
FIG. 12 illustrates a flow diagram for updating model weights for an artificial intelligence model based on a user request.

FIG. 12 illustrates a flow diagram for updating model weights for an artificial intelligence model based on a user request. In a process 1200, the weights used in the ranking algorithm described above may be updated based upon a user request. In a block 1205, a new data file is received. A query 1215 may respond to a user request to re-rank or update the ranking weights based upon a user request. When the query 1215 determines the requested re-ranking, a block 1220 performs a subsequent or re-ranking process by including the files since the previous ranking in the re-ranking process. In a block 1230, the ranking weights are updated based upon the re-ranking process.

Figure 13:
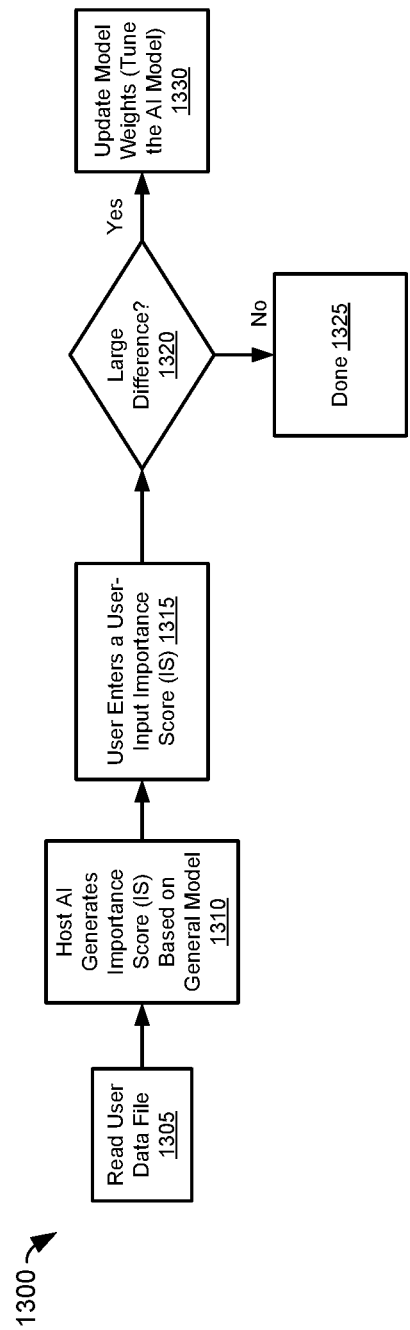
FIG. 13 illustrates a flow diagram for updating model weights for an artificial intelligence model based on user confirmation.

FIG. 13 illustrates a flow diagram for updating model weights for an artificial intelligence model based on user confirmation. The processor 1300 updates model weights based upon user confirmation. Such an approach allows a model, including the weighting, to be adapted to a specific user's definition of important documents. In a block 1305, the user data file is read. In a block 1310, and importance score is generated for the file based upon the process described above with respect to FIG. 7. In a block 1315, the user enters a user input importance score. In a query 1320, a difference is identified between the artificial intelligence model generated importance score from block 1310, and the user input importance score from block 1315. When the difference is small as defined by a threshold, then at block 1325 allows the current model weights to remain unchanged. When the difference is large as defined by a threshold, then a block 1330 updates model weights to further tune the artificial intelligence model.

Figure 14:
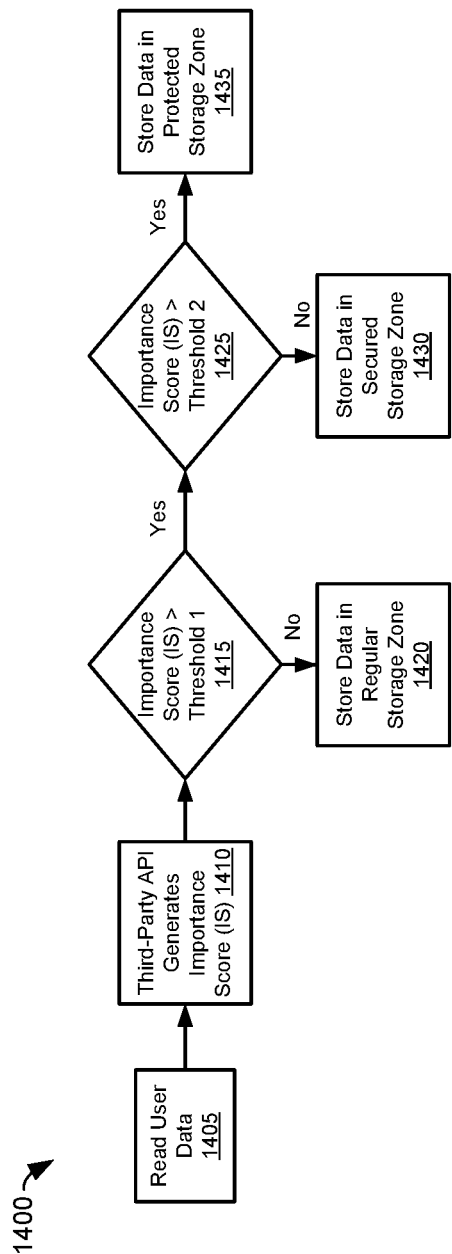
FIG. 14 illustrates a flow diagram for differently storing differently important data files based in part on third party generated importance scores.

FIG. 14 illustrates a flow diagram for differently storing differently important data files based in part on third party generated importance scores. The process 1400 may be performed by a third-party importance score module 137 in FIG. 1. In process 1400, a user data file is read in block 1405. The third-party, including a third-party API, provides third-party generated importance score input 230 (FIG. 2) in block 1410.

The received importance score is compared against a data file importance threshold in query 1415. The comparison may be against a first data file importance threshold. When the importance score is less than a first data file importance threshold, then the data file in a block 1420 is stored in a regular reliability storage zone, such as regular reliability storage zone 155 of FIG. 1. When the importance score is greater than the first data file importance threshold, then the importance score is compared against a second data file importance threshold in a query 1425. When the importance score is less than a second data file importance threshold, then the data file in a block 1430 is stored in a higher reliability (secured) storage area, such as higher reliability storage zone 150 of FIG. 1. When the importance score is greater than the second data file importance threshold, then the data file in block 1435 is stored in a yet higher reliability (protected) storage zone, such as write-protected storage (protection) zone 158 of FIG. 1.

Figure 15:
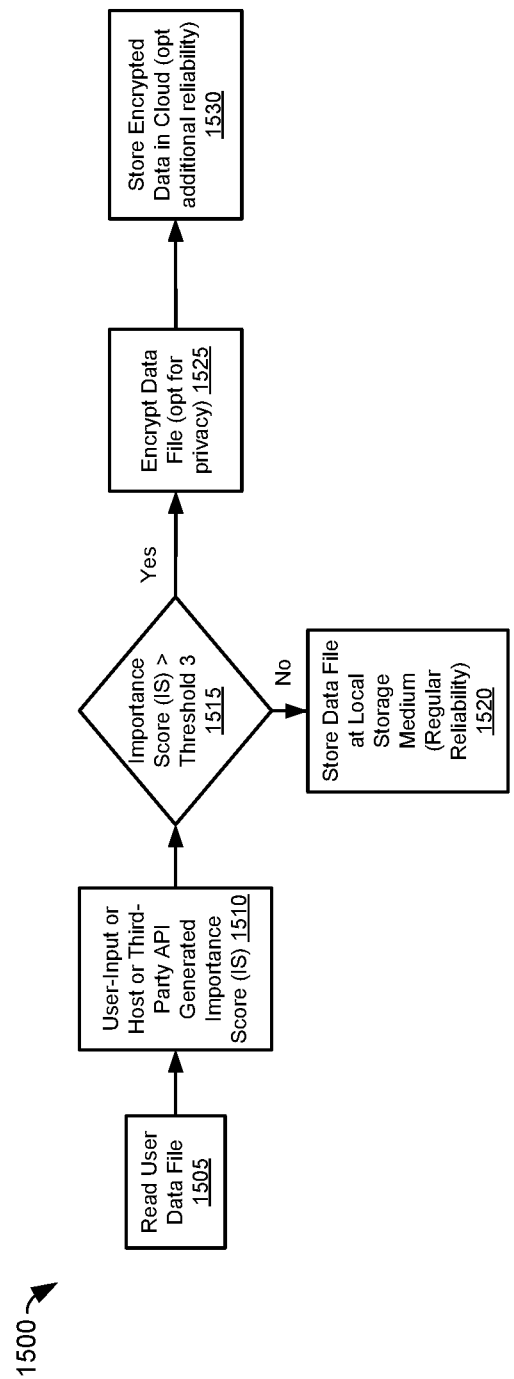
FIG. 15 illustrates a flow diagram for differently storing differently important data files in differently located storage medium.

FIG. 15 illustrates a flow diagram for differently storing differently important data files in differently located storage medium. The process 1500 generally allows for the selection of storing a data file in one of a local storage device or a cloud-based storage device, based upon a determined importance score. In a block 1505, the user data file is received. The block 1510, and importance score is generated based upon any of the importance score generation techniques described herein. For example, an importance score may be generated by user input as described in FIG. 4. Alternatively, an importance score may be generated by an artificial intelligence module as described in FIG. 5. Further, an importance score may be generated by a third-party module as described in FIG. 14.

A query 1515 compares importance score against a data file importance threshold. When the importance score is less than the data file importance threshold, then a block 1520 may store the data file on local storage medium exhibiting a regular reliability. When the importance score is greater than a data file importance threshold, then in a block 1530 may store the data file in a cloud-based medium 160 (FIG. 1) which exhibits a higher reliability. Further, the data file may be optionally encrypted in at block 1525 to provide further privacy with respect to storing the data file in a cloud-based medium.

Figure 16:
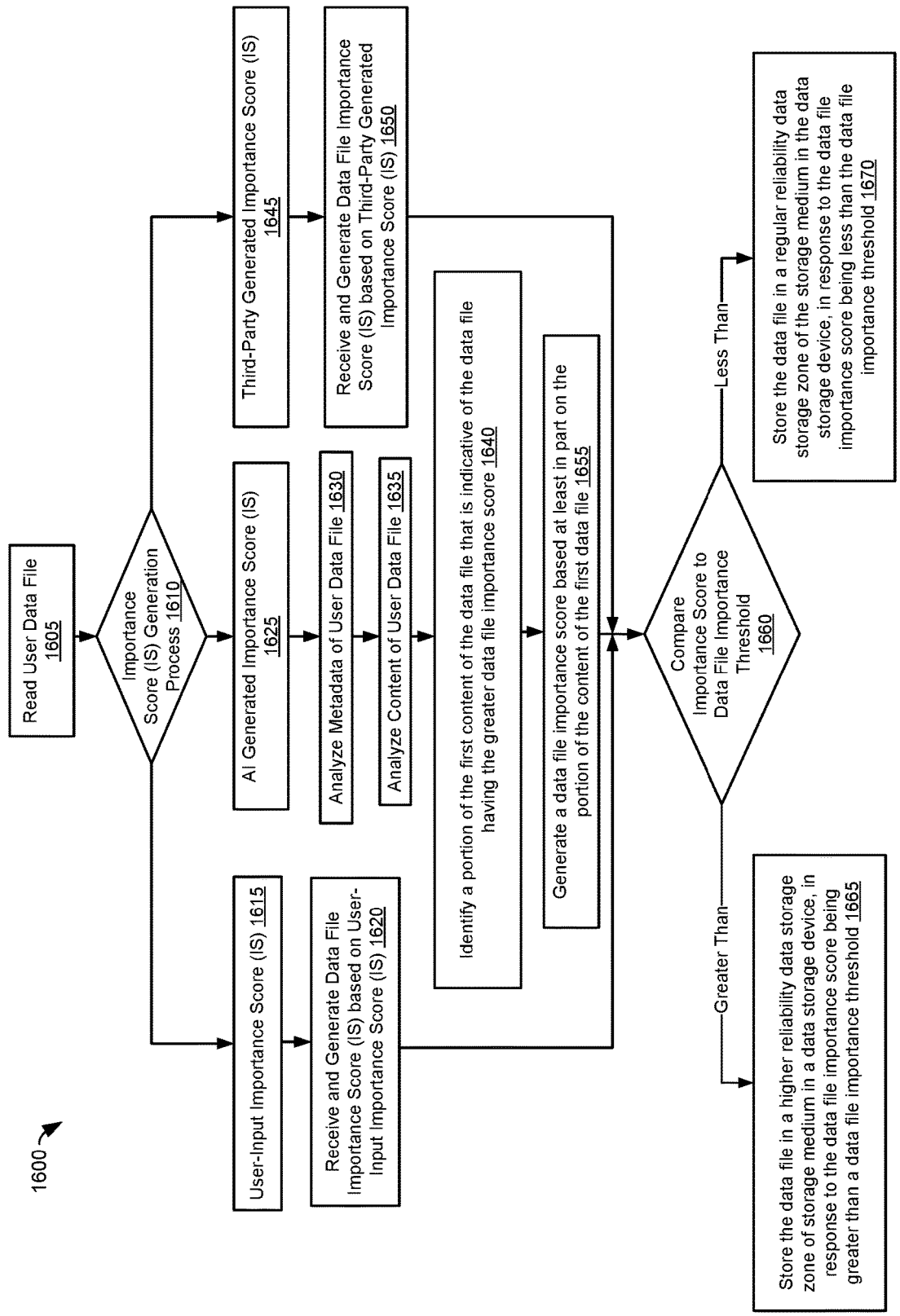
FIG. 16 illustrates a flow diagram for a method for differently storing data files based on a determined importance of a data file.

FIG. 16 illustrates a flow diagram for a method for differently storing data files based on a determined importance of a data file. Process 1600 may be implemented in a system as a computer-implemented method. The user data file is read in a block 1605. The determination is made in query 1610 regarding which importance score generation process is to be used. An importance score is generated based upon one of a user input importance score process 1615, and artificial intelligence generated importance score process 1625, or third-party generated importance score process 1645.

When the user input importance score generation process of FIG. 4 is selected, then a user importance score is received from a user in a block 1620. The user importance score is then compared in a block 1660 against a data file importance threshold, as described above. When the importance score is less than the data file importance threshold, then a block 1670 stores the data file in a regular reliability data storage zone of the storage medium in the storage device. When the importance score is greater than the data file importance threshold, then a block 1665 stores the data file in a higher reliability data storage zone of the storage medium in a data storage device.

When the artificial intelligence importance score generation process of FIG. 5 is selected, then a block 1630 analyzes the metadata of the user data file. Further, a block 1635 analyzes the content of the user data file. In a block 1640, vectors are formed which identify a portion of the content of the data file that is indicative of the data file having a greater or lesser data importance. Such processing of the data file is described above with respect to FIG. 6. In a block 1655, a data file importance score is generated based at least in part on a portion of the content of the first data file. The importance score is generated based upon the ranking processes described herein with respect, in part, to FIG. 7.

The importance score is then compared in a block 1660 against a data file importance threshold, as described above. When the importance score is less than the data file importance threshold, then a block 1670 stores the data file in a regular reliability data storage zone of the storage medium in the storage device. When the importance score is greater than the data file importance threshold, then the block 1665 stores the data file in a higher reliability data storage zone of the storage medium in a data storage device.

When the third-party importance score generation process illustrated in FIG. 14 is selected, then a user importance score is received from a third-party in a block 1650. The user importance score is then compared and the query 1660 against a data file importance threshold, as described above.

When the importance score is less than the data file importance threshold, then block 1670 stores the data file in a regular reliability data storage zone of the storage medium in the storage device. When the importance score is greater than the data file importance threshold, then block 1665 stores the data file in a higher reliability data storage zone of the storage medium in a data storage device.

Figure 17:
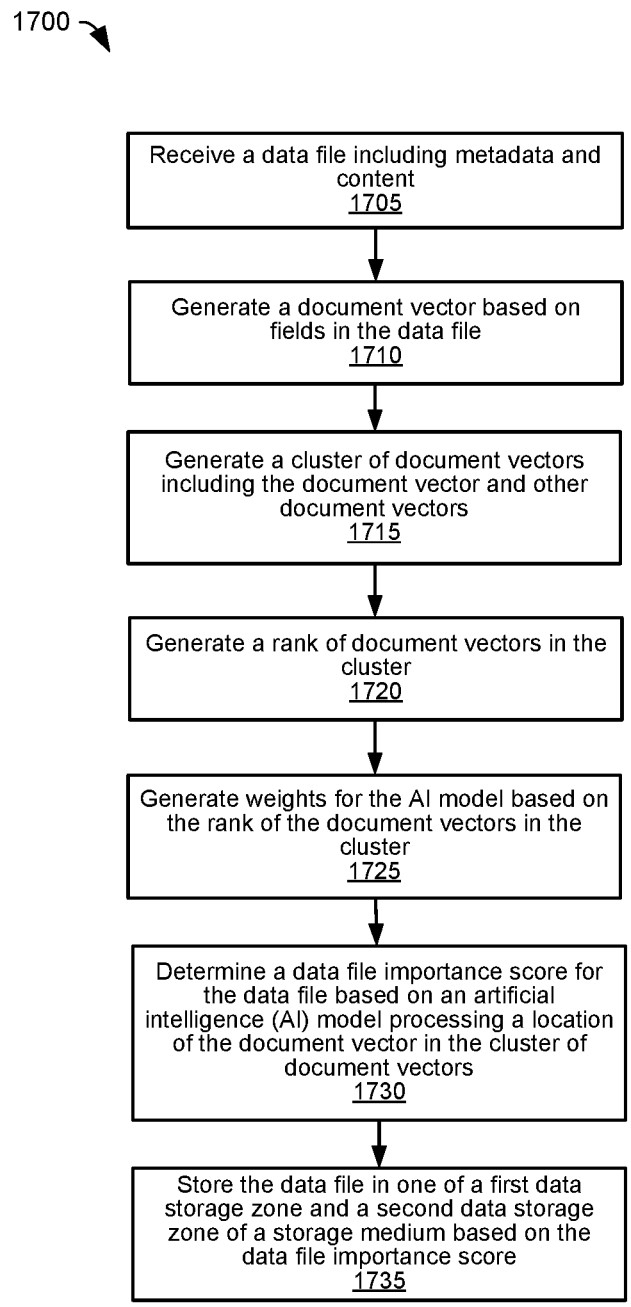
FIG. 17 illustrates a flow diagram for a method for determining an importance of a data file.

FIG. 17 illustrates a flow diagram for a method for determining an importance of a data file. A computer-implemented method 1700 generates and importance score and determines whether to store a data file in a first data storage zone of regular reliability, or a second data storage zone of a higher reliability. Generally, some of the vectors of features in the document vectors are enhanced or discounted by the weights. The models are configured to perform clustering and ranking of document vectors using artificial intelligence. In clustering, the document vectors may be mapped into a cluster exhibiting a cluster center. The resulting clustered document vectors are then ranked based upon a distance from the cluster center to each of the document vectors. Other ranking techniques may also be used including similarity matrices, and graph analysis. An importance score is then assigned to each document vector based upon the ranking of the document vector to the cluster center. An important data threshold is then applied to each of the document file importance scores to determine which data files corresponding to a document vector are to be stored in a higher reliability storage zone, and which data files are to be stored in a regular reliability storage zone.

In a block 1705, a data file including metadata and content is received. Further, the computer-implemented method may scan the content in the data file for keywords in at least one of the metadata and the content. Respective vectors are generated for the data file based on the keywords, and the respective vectors are combined to form the document vector. Respective vectors for the data file may be generated based on the keywords, and the respective vectors may be combined to form the document vector.

In a block 1710, a document vector is generated for a data file based on content processed from a data file, wherein the data file includes metadata and the content.

In a block 1715, a cluster of document vectors including the document vector and other document vectors associated with other data files is generated.

In a block 1720, the document vectors in the cluster are ranked into a list or rank.

In a block 1725, weights are generated for the AI model based on the rank of the document vectors in the cluster. In an aspect, the cluster of document vectors may be re-ranked. Further, re-ranking the cluster of document vectors may be based on a quantity of data files stored in the storage media since the rank or previous re-ranking of the cluster of document vectors. Yet further, the re-ranking the cluster of document vectors may be based on a duration of time since the ranking or previous re-ranking of the cluster of document vectors. Further, the re-ranking the cluster of document vectors may be based on a user-input request to re-ranking of the cluster of document vectors. Yet further, the weights for the AI model may be updated in response to the re-rank of the cluster. Yet further, updating the weights for the AI model may be based on a difference between the importance score generated by the AI model and a user-input importance score being greater than a threshold.

In a block 1730, a data file importance score is determined for the data file based on an artificial intelligence (AI) model processing a location of the document vector in the cluster of document vectors.

In a block 1735, the data file is stored in one of a first data storage zone and a second data storage zone of a storage media based on the data file importance score.

The various examples presented herein allow a user data file to be differently stored in differently reliable storage medium based upon a determined importance of the data file.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

It should be understood that various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer-readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the Python, JavaScript, Java, and/or C programming languages, or another suitable programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
a storage medium including a first data storage zone and a second data storage zone, wherein:
the first data storage zone has a first reliability;
the second data storage zone has a second reliability; and
the first reliability is higher than the second reliability; and
a controller configured to:
generate, for each data file of a plurality of document data files, a document vector for that data file based on content processed from that data file, wherein each data file includes metadata and content;
generate, based on a plurality of document vectors for the plurality of document data files, a ranking of document vectors;
generate, based on the ranking of document vectors, weights for an artificial intelligence (AI) model;
receive a first data file;
generate, for the first data file, a first document vector;
generate, using the AI model, the weights, and the first document vector, a data file importance score for the first data file; and
store the first data file in one of the first data storage zone and the second data storage zone based on the data file importance score.

2. The system of claim 1, wherein the controller is further configured to generate the ranking of document vectors by:
generating, from the plurality of document vectors, a cluster of document vectors, wherein:
each document vector in the cluster of document vectors has a location in the cluster; and
the ranking of document vectors is based on the location of each document vector.

3. The system of claim 1, wherein:
the controller is further configured to:
generate, for each data file of the plurality of document data files, a plurality of attribute vectors based on the metadata and content of that data file; and
assemble, for each data file of the plurality of document data files, the plurality of attribute vectors for that data file into the document vector for that data file; and
the weights for the AI model are based on the plurality of attribute vectors.

4. The system of claim 1, wherein the controller is further configured to:
re-rank the document vectors; and
update the weights for the AI model in response to the re-rank of the document vectors.

5. The system of claim 4, wherein the re-rank of the document vectors is based on time since a previous re-rank of the document vectors.

6. The system of claim 4, wherein the re-rank of the document vectors is based on a received request to re-rank the document vectors.

7. The system of claim 4, wherein the controller is further configured to:
determine a quantity of data files stored in the storage medium since an occurrence of the ranking of the document vectors or a previous re-ranking of the document vectors, wherein the re-rank of the document vectors is based on the quantity of data files.

8. The system of claim 1, wherein the controller is further configured to:
receive a request including a user input provided via a computing device of a user, the user input including a user-input importance score; and
update the weights for the AI model based on a difference between the importance score generated by the AI model and a user-input importance score being greater than a threshold.

9. The system of claim 1, wherein the controller is further configured to:
generate the ranking of document vectors by:
generating, from the plurality of document vectors, a plurality of clusters corresponding to different cluster attributes from attribute vectors in the plurality of document vectors; and
generating, for each cluster of the plurality of clusters, a rankings of document vectors in that cluster;
determine, based on attribute vectors of the first data file, a first cluster from the plurality of clusters; and
use weights from the rankings of the first cluster to generate the data file importance score for the first data file.

10. A computer-implemented method, comprising:
generating, for each data file of a plurality of document data files, a document vector for that data file based on content processed from that the data file, wherein each data file includes metadata and content;
generating, based on a plurality of document vectors for the plurality of document data files, a ranking of document vectors;
generating, based on the ranking of document vectors, weights for an artificial intelligence (AI) model;
receiving a first data file;
generating, for the first data file, a first document vector;
generating, using the AI model, the weights, and the first document vector, a data file importance score for the first data file; and
storing the first data file in one of a first data storage zone and a second data storage zone of a storage medium based on the data file importance score, wherein:
the first data storage zone has a first reliability;
the second data storage zone has a second reliability; and
the first reliability is higher than the second reliability.

11. The computer-implemented method of claim 10, further comprising:
generating, from the plurality of document vectors, a document vectors, wherein:
each document vector in the document vectors has a location in the cluster; and
the ranking of document vectors is based on the location of each document vector.

12. The computer-implemented method of claim 11, further comprising:
generating, for each data file of the plurality of document data files, a plurality of attribute vectors based on the metadata and content of that data file; and
assembling, for each data file of the plurality of document data files, the plurality of attribute vectors for that data file into the document vector for that data file, wherein the weights for the AI model are based on the plurality of attribute vectors.

13. The computer-implemented method of claim 10, further comprising:
re-ranking the document vectors; and updating the weights for the AI model in response to the re-rank of the document vectors.

14. The computer-implemented method of claim 13, wherein re-ranking the document vectors is based on a duration of time since a previous re-ranking of the document vectors.

15. The computer-implemented method of claim 13, wherein re-ranking the document vectors is based on a received request to re-rank the document vectors.

16. The computer-implemented method of claim 13, further comprising:
   determining a quantity of data files stored in the storage medium since an occurrence of the ranking of the document vectors or a previous re-ranking of the document vectors, wherein re-ranking the document vectors is based on the quantity of data files.

17. The computer-implemented method of claim 11, further comprising:
   receiving a request including a user input provided via a computing device of a user, the user input including a user-input importance score; and
   updating the weights for the AI model based on a difference between the importance score generated by the AI model and the user-input importance score being greater than a threshold.

18. The computer-implemented method of claim 10, further comprising:
   generating, from the plurality of document vectors, a plurality of clusters corresponding to different cluster attributes from attribute vectors in the plurality of document vectors;
   generating, for each cluster of the plurality of clusters, a rankings of document vectors in that cluster;
   determining, based on attribute vectors of the first data file, a first cluster from the plurality of clusters; and
   using weights from the rankings of the first cluster to generate the data file importance score for the first data file.

19. The computer-implemented method of claim 18, wherein:
   at least one attribute vector is based on keywords in the content of the first data file; and
   the keywords include defined words that are unique to a specific user.

20. A system, comprising:
   means for generating, for each data file of a plurality of document data files, a document vector for that data file based on content processed from that data file, wherein each data file includes metadata and content;
   means for generating, based on a plurality of document vectors for the plurality of document data files, a ranking of document vectors;
   means for generating, based on the ranking of document vectors, weights for an artificial intelligence (AI) model;
   means for receiving a first data file;
   means for generating, for the first data file, a first document vector;
   means for generating, using the AI model, the weights, and the first document vector, a data file importance score for the first data file; and
   means for storing the first data file in one of a first data storage zone and a second data storage zone of a storage medium based on the data file importance score, wherein:
   the first data storage zone has a first reliability;
   the second data storage zone has a second reliability; and
   the first reliability is higher than the second reliability.

* * * * *